United States Patent [19]

Sawahashi et al.

[11] Patent Number: 5,745,531
[45] Date of Patent: Apr. 28, 1998

[54] AUTOMATIC GAIN CONTROL APPARATUS, COMMUNICATION SYSTEM, AND AUTOMATIC GAIN CONTROL METHOD

[75] Inventors: Mamoru Sawahashi, Yokosuka; Fumiyuki Adachi, Yokohama, both of Japan

[73] Assignee: NTT Mobile Communications Network, Inc., Japan

[21] Appl. No.: 411,605

[22] PCT Filed: Aug. 9, 1994

[86] PCT No.: PCT/JP94/01310

§ 371 Date: Jun. 26, 1995

§ 102(e) Date: Jun. 26, 1995

[87] PCT Pub. No.: WO95/05038

PCT Pub. Date: Feb. 16, 1995

[30] Foreign Application Priority Data

Aug. 11, 1993 [JP] Japan ................. 5-199448

[51] Int. Cl.$^6$ ........................................ H04L 27/08
[52] U.S. Cl. ........................... 375/345; 455/239.1
[58] Field of Search ........................... 375/200, 201, 375/202, 203, 204, 205, 206, 207, 345, 316; 455/232.1, 233.1, 234.1, 234.2, 235.1, 236.1, 239.9, 240.1

[56] References Cited

U.S. PATENT DOCUMENTS

| | | | |
|---|---|---|---|
| 3,605,018 | 9/1971 | Coviello et al. | 375/200 |
| 4,984,287 | 1/1991 | Kaufman et al. | 375/200 |
| 5,065,410 | 11/1991 | Yoshida et al. | 375/345 |
| 5,452,332 | 9/1995 | Otani et al. | 375/345 |

FOREIGN PATENT DOCUMENTS

| | | |
|---|---|---|
| 0361452 | 4/1990 | European Pat. Off. . |
| 64-033025 | 2/1986 | Japan . |
| 64-010746 | 1/1989 | Japan . |
| 4-123328 | 5/1992 | Japan . |
| 9305585 | 3/1993 | WIPO . |

*Primary Examiner*—Tesfaldet Bocure
*Assistant Examiner*—Bryan Webster
*Attorney, Agent, or Firm*—Rogers & Wells; George P. Hoare, Jr.

[57] ABSTRACT

An automatic gain control apparatus of a spread spectrum signal receiver which can quickly follow distance variations, median variations, and instantaneous variations due to Rayleigh fading. An output of a variable gain amplifier 22 is quadrature-detected, the detected outputs are A/D converted, the digital output thereof are supplied to a despreading processor 34 through a digital level corrector 33, and the despreading output undergoes the instantaneous envelope detection by an instantaneous envelope detector 37. The envelope-detected signal is supplied to a symbol timing generator 38 which extracts data symbol timing component using a peak signal as a trigger, and a time window through which a desired signal enters is calculated from the symbol timing. Within the time window, the output of the instantaneous envelope detector 37 undergoes time integration by a level detector 43, and its output shifts the level of the digital level corrector 33, thereby making the output constant. The output of the level detector 43 is averaged over a few symbol length by a level detector 44 whose output controls the gain of the variable gain amplifier 22, thereby making its output constant.

10 Claims, 3 Drawing Sheets

AUTOMATIC GAIN CONTROL APPARATUS, COMMUNICATION SYSTEM, AND AUTOMATIC GAIN CONTROL METHOD

TECHNICAL FIELD

The present invention relates to a gain control apparatus of a receiver for mobile communication systems, and more particularly to an automatic gain control apparatus and method of a receiver for mobile communications using CDMA systems which perform multiple access using a spread-spectrum.

BACKGROUND ART

The propagation characteristic of terrestrial mobile communications is represented by three factors: variations involved in the distance variations between a base station and a mobile station (distance variations); moderate variations over an interval of about several tens of meters (median variations); and rapid variations in an interval of several tens of meters (instantaneous variations). The variations in a received signal involved in the distance variations is the greatest among these variations. For example, the received signal will attenuate more than 70 dB at an edge of a cell separated far from the base station. Accordingly, a dynamic range of more than 70 dB is required of a mobile communication receiver.

Thus, since the received signal level fluctuates more than 70 dB in a mobile communication system, and other users are carrying on telephone conversations through other channels in adjacent frequency bands, it is necessary to amplify the received signal to a level sufficient for detection after having removed unnecessary signals of adjacent channels. Analog signal transmission systems or systems using only phase shift information such as a π/4 shift QPSK modulation which will be employed in digital systems introduced at the next term, regulate level variations of an input signal of a receiver by amplifying the signal more than 70 dB using a limiter amplifier after band limiting.

However, when a linear modulation is performed, or when information is carried by amplitude components, a linear reception is required. Since a conventional limiting amplifier will corrupt amplitude information, an automatic gain control amplifier which performs linear amplification is necessary in this case. Recently, the digital signal processing has become the main current, owing to the development of the digital signal processing, in which a received signal is A/D converted before processing. In the mobile communications, however, quantization error of the A/D conversion increases when a received level drops, because variations in the received level due to fading are very large of about 60 dB. To handle this problem, an automatic gain control circuit is essential which compensates for the received level variations.

FIG. 2 is a block diagram showing a conventional feedback type automatic gain control circuit. The conventional feedback type automatic gain control circuit includes a variable gain control amplifier 11 whose gain is varied in accordance with a bias voltage, and an instantaneous envelope level detector 12 which detects an envelope level of the output signal. The instantaneous envelope level from the detector 12 is supplied to the variable gain control amplifier 11 as the bias voltage. Thus, the gain of the variable gain control amplifier 11 fluctuates in accordance with the variations in the instantaneous envelope level, thereby keeping constant the output signal level of the variable gain control amplifier 11 using the closed loop.

In the feedback type automatic gain control circuit, it will be sufficient for the instantaneous envelope level detector 12 to have an input dynamic range on the order of a few tens of dB at most because the output signal of the variable gain control amplifier 11 is inputted thereto. Correction using the closed loop, however, takes a rather long time for convergence of the level. This makes it difficult to track instantaneous variations in the signal level, and presents a problem in that it is difficult for the closed loop control to follow instantaneous variations such as rising edges of burst signals.

On the other hand, a feedforward type automatic gain control circuit has an open loop configuration, and an input signal to a variable gain control amplifier is also inputted to an instantaneous envelope level detector. As a result, its instantaneous rising characteristic is better than that of the feedback type. The feedforward type, however, has a problem in that it requires an instantaneous envelope level detector of a wider dynamic range because the level of the input signal to the instantaneous envelope level detector fluctuates more than 70 dB.

In an FDMA which uses one carrier wave per channel, individual users perform communications using different frequencies. If a user employing the same carrier wave is present in a contiguous cell, this will cause the same channel interference. In a digital mobile communication system employing a TDMA system which multiplexes information of respective users on the time axis, although a plurality of users can use the same carrier wave, the channel interference will arise if a user using the same carrier wave is present in another cell. Since the channel interference will degrade the communication quality, the same frequency carrier wave can be used only in cells separated apart by a considerable distance.

In a CDMA system where individual users are identified by spreading codes, a plurality of users communicate using carrier waves of the same frequency. In addition, the identical frequency can be used in contiguous cells. Therefore, the same frequency can be reused in shorter distance as compared with FDMA or TDMA. Accordingly, the capacity in terms of the number of subscribers per frequency band can be increased in the CDMA system. In the CDMA system, however, it is impossible to achieve perfect orthogonalization so that the correlations between spreading codes assigned to individual users do not become zero. Thus, despread signal of a user will include interference from other users owing to the correlations.

DISCLOSURE OF THE INVENTION

To eliminate the interference from other users, despreading and interference cancelling are performed by a digital signal processing after an A/D conversion. In this case, unless highly accurate quantization of the digital signal obtaining by the A/D conversion is sufficiently guaranteed, accuracy of the despreading and the interference cancelling will be degraded. For this reason, the receiving portion is required to absorb instantaneous variations due to Rayleigh fading.

In order to apply the CDMA system to the mobile communications, transmission power control is required to minimize interference from other users within the cell. A high accuracy transmission power control which tracks instantaneous variations due to Rayleigh fading can be achieved by measuring the level of a desired signal in the reverse direction at a base station, by inserting a transmission power control bit into a forward frame at a fixed time interval, and by controlling the transmission power of a mobile station. In this case, the received level of the desired signal will change by an amount corresponding to a few bits within one frame time interval. Accordingly, the base station must follow the variations in the received signal of the few bits.

Therefore, an object of the present invention is to provide an automatic gain control apparatus of a spread spectrum signal receiver which can quickly track not only the distance variations and the median variations, but also the instantaneous variations involved in Rayleigh fading.

To accomplish this object, the present invention as claimed in claim 1 comprises variable gain control amplifying means for amplifying a received spread spectrum signal;

- quadrature detection means for quadrature-detecting a signal amplified by said variable gain control amplifying means;
- despreading means for despreading a signal quadrature-detected by said quadrature detection means;
- means for obtaining an in-phase component and a quadrature component of a modulated signal despread by said despreading means;
- A/D converting means for converting output signals of the quadrature detection means into digital signals to be supplied to the despreading means;
- digital level correcting means for digitally converting a level of an in-phase component and that of a quadrature component of the digital signals;
- instantaneous envelope detecting means for obtaining a square component of an amplitude of the modulated signal;
- symbol timing generating means for detecting a symbol timing from an output signal of the instantaneous envelope detecting means;
- first desired signal level detecting means for obtaining a signal level of a desired signal by accumulating the output signal of the instantaneous envelope detection means over a range of a propagation delay time using a symbol timing signal outputted from the symbol timing generating means as a reference; and
- second desired signal level detecting means for obtaining a signal level of the desired signal by accumulating, over a few symbol interval, a desired signal level outputted from the first desired signal level detecting means.

The present invention as claimed in claim 2 is directed to the automatic gain control apparatus of claim 1, wherein the digital level correcting means corrects the output signal level of the first desired signal level detecting means to take a constant value by using the output of the first desired signal level detecting means, and the variable gain control amplifying means perform amplification to make the output signal level of the second desired signal level detecting means constant by using the output of the second desired signal level detecting means.

The present invention as claimed in claim 3 is directed to the automatic gain control apparatus of claim 2, wherein an envelope detector for detecting an envelope level of an output signal of the variable gain control amplifying means; and means for correcting an operating point of the variable gain amplifying means such that an output signal of the envelope detector is reduced by using the output signal of the envelope detector when the output signal of the envelope detector exceeds a predetermined level.

The present invention as claimed in claim 4 comprises variable gain control amplifying means for amplifying the spread spectrum signal received by said receiving means;

- quadrature detection means for quadrature-detecting a signal amplified by said variable gain control amplifying means;
- despreading means for despreading a signal quadrature-detected by said quadrature detection means;
- means for obtaining an in-phase component and a quadrature component of a modulated signal despread by said despreading means;
- A/D converting means for converting output signals of the quadrature detection means into digitals signals to be supplied to the despreading means;
- digital level correcting means for digitally converting a level of an in-phase component and that of a quadrature component of the digital signals;
- instantaneous envelope detecting means for obtaining a square component of an amplitude of the modulated signal;
- symbol timing generating means for detecting a symbol timing from an output signal of the instantaneous envelope detecting means;
- first desired signal level detecting means for obtaining a signal level of a desired signal by accumulating the output signal of the instantaneous envelope detection means over a range of a propagation delay time using a symbol timing signal outputted from the symbol timing generating means as a reference; and
- second desired signal level detecting means for obtaining a signal level of the desired signal by accumulating, over a few symbol interval, a desired signal level outputted from the first desired signal level detecting means.

The present invention as claimed in claim 5 is directed to the communication system of claim 4, wherein the digital level correcting means corrects the output signal level of the first desired signal level detecting means to take a constant value by using the output of the first desired signal level detecting means, and the variable gain control amplifying means performs amplification to make constant the output signal level of the second desired signal level detecting means by using the output of the second desired signal level detecting means.

The present invention as claimed in claim 6 is directed to the communication system set forth in claim 5, wherein an envelope detector for detecting an envelope level of an output signal of the variable gain control amplifying means; and means for correcting an operating point of the variable gain amplifying means such that an output signal of the envelope detector is reduced by using the output signal of the envelope detector when the output signal of the envelope detector exceeds a predetermined level.

The present invention as claimed in claim 7 comprises quadrature-detecting a signal amplified by said variable gain control amplifying means;

despreading means for despreading a signal quadrature-detected by said quadrature detection means;

means for obtaining an in-phase component and a quadrature component of a modulated signal despread by said despreading means;

A/D converting step of converting output signals of the quadrature detection means into digital signals to be supplied to the despreading means;

digital level correcting step of digitally converting a level of an in-phase component and that of a quadrature component of the digital signals;

instantaneous envelope detecting step of obtaining a square component of an amplitude of the modulated signal;

symbol timing generating step of detecting a symbol timing from an output signal of the instantaneous envelope detecting step;

first desired signal level detecting step of obtaining a signal level of a desired signal by accumulating the output signal of the instantaneous envelope detection step over a range of a propagation delay time using the symbol timing as a reference; and second desired signal level detecting step of obtaining a signal level of the desired signal by accumulating, over a few symbol interval, a desired signal level outputted at the first desired signal level detecting step.

The present invention as claimed in claim 8 is directed to the automatic gain control method of claim 7, wherein the digital level correcting step corrects the output signal level of the first desired signal level detecting step to take a constant value by using the output of the first desired signal level detecting step, and the variable gain control amplifying step performs amplification to make the output signal level of the second desired signal level detecting step constant by using the output of the second desired signal level detecting step.

The present invention as claimed in claim 9 is directed to the automatic gain control method of claim 8, wherein an envelope detecting step of detecting an envelope level of an output signal of the variable gain control amplifying step; and a step of correcting an operating point of the variable gain amplifying means such that an output signal of the envelope detecting step is reduced by using the output signal of the envelope detecting step when the output signal of the envelope detecting exceeds a predetermined level.

According to the present invention, the gain of a variable gain control amplifier 22 is controlled in response to the output of a second desired signal level detector 44. A line 51 in FIG. 3 illustrates the distance variations and the median variations of the desired signal level. The present invention compensates for these variations. A curve 52 in FIG. 3 shows the instantaneous variations involved in Rayleigh fading of the desired signal level. A digital level corrector 33 is controlled by the detected output of a first desired signal level detector 43 so that the output of the digital level corrector is kept constant. Since this control is digitally performed, the level correction following the instantaneous variations can be achieved.

Moreover, according to the present invention, the gain of the variable gain control amplifier 22 is controlled in response to the output of an envelope detector 46 when an excessive input is applied. Therefore, A/D converters 31 and 32 are not saturated. As a result, the gain can be controlled following the instantaneous variations over a wide dynamic range. Thus, sufficient quantization accuracy of the signal after the A/D conversion can be obtained even under Rayleigh fading. In addition, the input levels to the A/D converters can be kept constant at the receiving side under the transmission power control which follows the instantaneous variations.

BEST MODE FOR CARRYING OUT THE INVENTION

Embodiments of the invention will now be described in detail with reference to the accompanying drawings.

Figure 1:
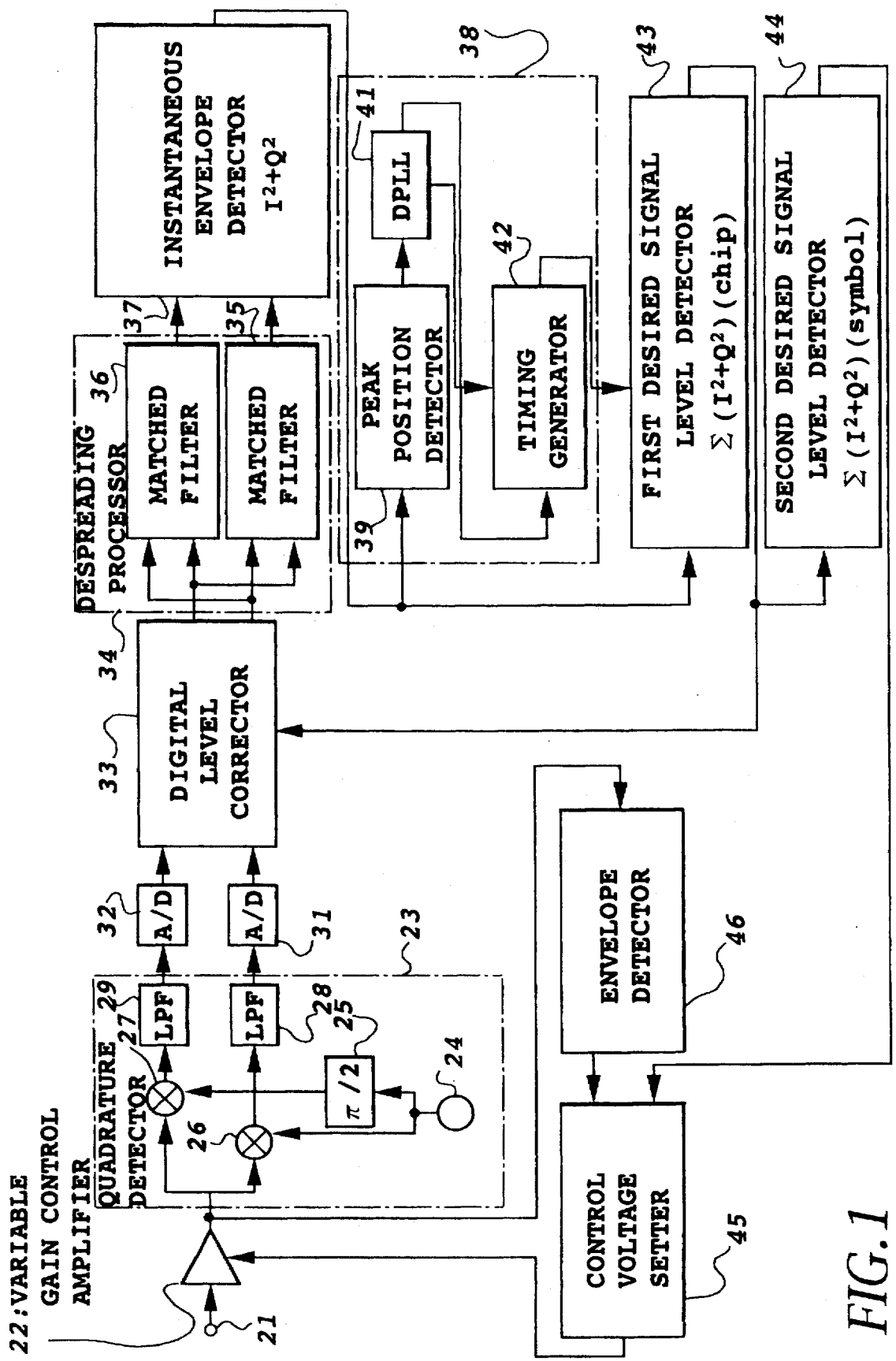
FIG. 1 is a block diagram showing hardware of an automatic gain control apparatus in accordance with the present invention.
Figure 2:
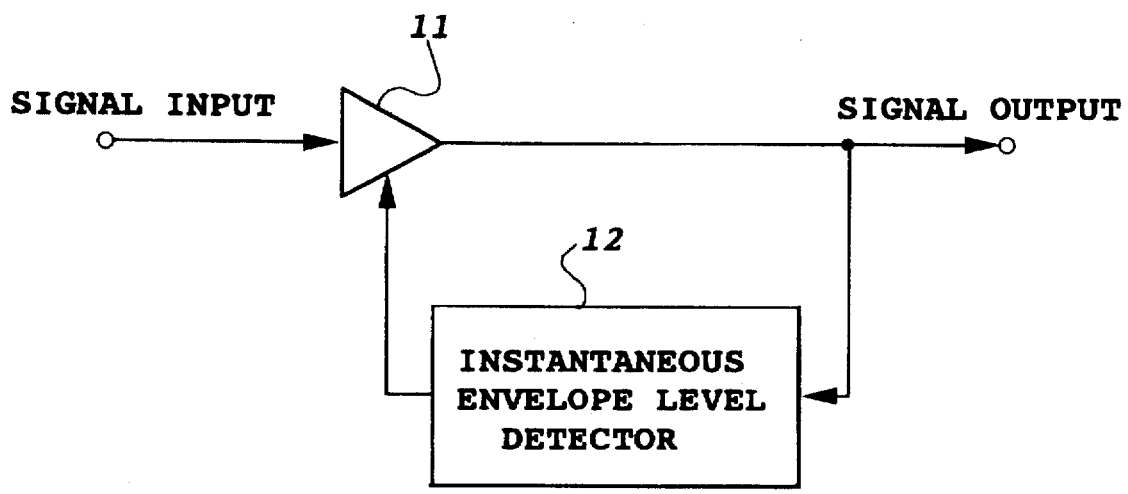
FIG. 2 is a block diagram showing a conventional feedback type automatic gain control circuit.

FIG. 1 is a block diagram showing hardware of an automatic gain control apparatus in accordance with the present invention. A received spread spectrum signal from an input terminal 21 is converted into an intermediate frequency signal, and is amplified by a variable gain control amplifier 22. The amplified output undergoes a quadrature detection by a quadrature detector 23. Specifically, for example, the output of the amplifier 22 is multiplied, by means of the multipliers 26 and 27, by the output of a local oscillator 24 and the output of a phase shifter 25 which shifts the phase of the output of the local oscillator 24 by 90 degrees, respectively, thereby performing quadrature detection and outputting baseband signals of two channels I and Q. The baseband spread signals which have undergone the quadrature detection are passed through low-pass filters 28 and 29 so that their higher harmonics are eliminated, and then they are supplied to A/D converters 31 and 32.

The I and Q signals from the A/D converters 31 and 32 are level-converted by a digital level corrector 33. The digital level corrector 33 corrects the signal levels to compensate for the instantaneous variations whose interval is about several symbol long. One method to perform such correction is as follows: First, output signal levels are prestored in a memory for respective input signal levels with gain control signals as a parameter; and then, the levels are corrected with reference to the ROM table. Another method corrects the levels by multiplying the input signal levels by gain control signal information. A method using a bit shift can also be considered, but this method is ineffective because a highly accurate level correction cannot be achieved by this method.

The level-converted signals are despread by matched filters (or a sliding correlator) 35 and 36 in a despread processor 34 using spreading code replicas synchronized with a received spreading code. The despread signals are supplied to an instantaneous envelope detector 37. The instantaneous envelope detector 37 obtains from the despread signal an instantaneous envelope level signal of the IF modulated signal, and further calculates an envelope component of $I^2+Q^2$.

A symbol timing generator 38 extracts a data symbol timing component from the envelope component using a peak signal of the envelope component as a trigger. The symbol timing generator 38 includes a peak position detector 39, a DPLL 41, and a timing generator 42. The peak position detector 39 detects peak positions of the envelope component detected by the instantaneous envelope detector 37. When the peak positions are detected, signal power appears in the signals despread by the matched filters within a few chip intervals in accordance with a delay profile.

Generally, the profile becomes an object for the greatest chip. The signal power is RAKE combined over a few chips before and after the peak positions. Since the time of the peak position shifts in the receiver with the movement of a mobile station, tracking is required. If the current peak position shifts to the adjacent chip position during observation over a few symbol interval, for example, the signal power over a few chips before and after the maximum peak position is RAKE combined. The digital phase locked loop (DPLL) 41 is driven by using the detected peak signal as a trigger. Then, the data symbol timing is produced from the timing generator 42. The timing generator 42 calculates from the symbol timing a time window through which the desired signal enters.

A first desired signal level detector 43 integrates the instantaneous envelope of the output of the instantaneous envelope detector 37 over the time window width, that is, over the propagation delay time. The time integral is carried out by an accumulator. After the time window interval has elapsed, the accumulator is reset. A second desired signal level detector 44 averages the level of the detected desired signal over a few symbol interval.

The digital level corrector 33 is controlled by the level detected by the first desired signal level detector 43. Thus, since the input digital signal is level-converted by the detected level of the first desired signal, the level due to the instantaneous variations is absorbed, and the level of the output digital signal becomes constant.

The level detected by the second desired signal level detector 44 is supplied to a control voltage setter 45. The gain of the variable gain control amplifier 22 is controlled by the output of the control voltage setter 45, so that the output level of the variable gain control amplifier 22 becomes constant. The output of the variable gain control amplifier 22 is envelope-detected by the envelope detector 46. When the output of the envelope detector 46 exceeds a predetermined level, the control voltage setter 45 is controlled so that the operating point of the variable gain control amplifier 22 is corrected. Thus, the gain of the variable gain control amplifier 22 is controlled by the detected output of the second desired signal level detector 44 in the case where the output of the envelope detector 46 is below the predetermined level. The correction of the operating point of the variable gain control amplifier 22 based on the output of the envelope detector 46 prevents the input signals to the A/D converters 31 and 32 from being saturated.

Figure 3:
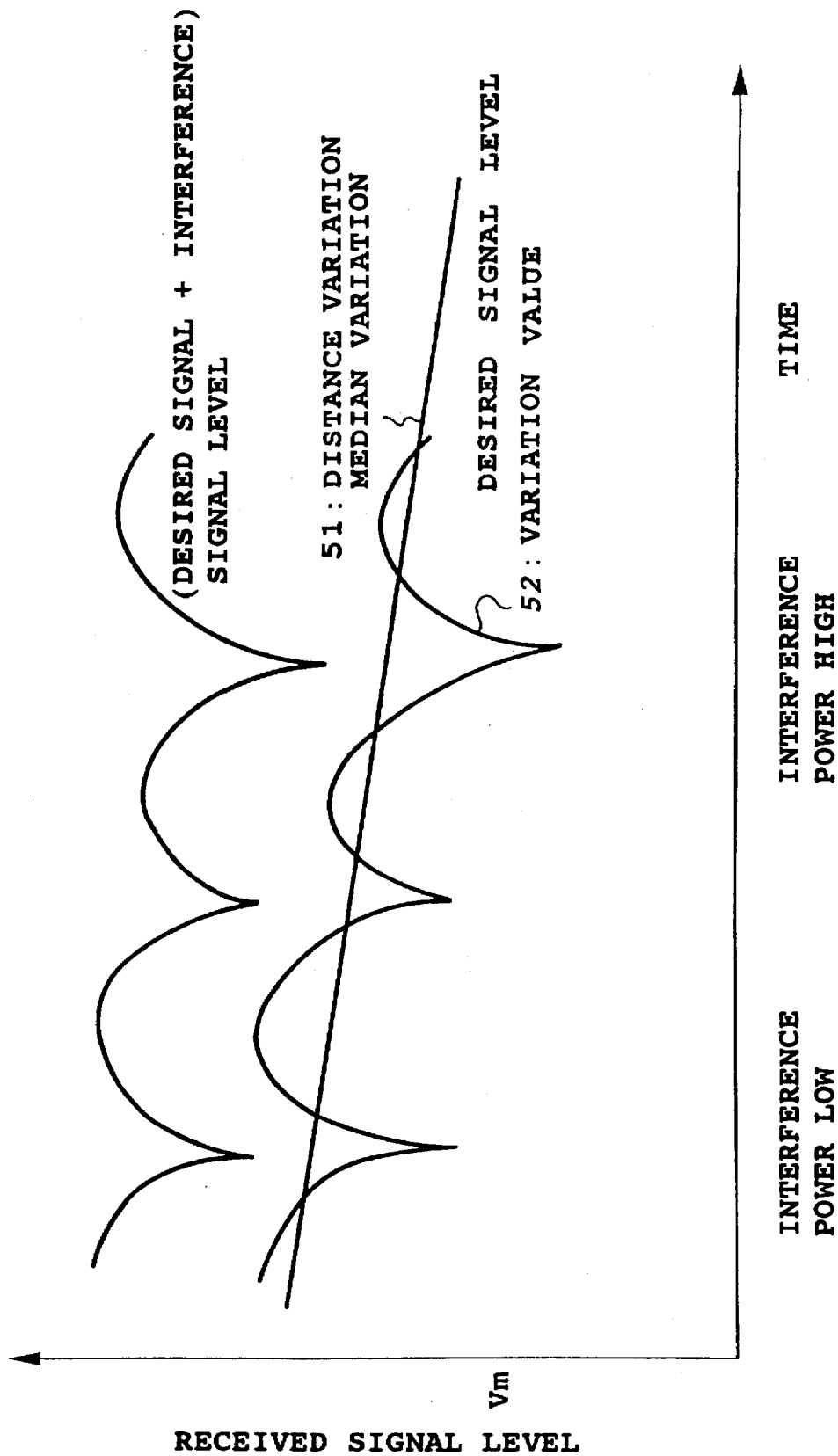
FIG. 3 is a diagram illustrating distance variations, median variations, and instantaneous variations of the level of a desired signal.

The line 51 of FIG. 3 indicates the distance variations and the median variations in the desired signal level. According to the present invention, these variations are compensated. The curve 52 of FIG. 3 shows the instantaneous variations accompanying Rayleigh fading of the desired signal level. According to the present invention, the output of the first desired signal level detector 43 controls the digital level corrector 33 in order to keep constant the output level of the digital level corrector 33. Since the digital level corrector 33 is digitally controlled, the level control can be achieved in response to the instantaneous variations.

Furthermore, according to the present invention, the gain of the variable gain control amplifier 22 is controlled using the output of the envelope detector 46 when an excessive input is applied. As a result, the A/D converters 31 and 32 are protected from being saturated. This makes it possible to control the gain in accordance with the instantaneous variations over a wide dynamic range, and to keep high quantization accuracy of the signal after the A/D conversion. The input level to the A/D converters at the receiving side can also be kept constant with respect to the transmission power control following the instantaneous variations.

What is claimed is:

1. An automatic gain control apparatus of a spread spectrum signal receiver, in a CDMA mobile communication system, having analog variable gain control amplifying means for amplifying a received spread spectrum signal, quadrature detection means for quadrature-detecting a signal amplified by said variable gain control amplifying means, and despreading means for despreading a signal quadrature-detected by said quadrature detection means, said automatic gain control apparatus further comprising:

means for obtaining an in-phase component and a quadrature component of a modulated signal despread by said despreading means;

A/D converting means for converting output signals of said quadrature detection means into digital signals to be supplied to said despreading means;

digital level correcting means for digitally converting a level of an in-phase component and that of a quadrature component of said digital signals to obtain a level corrected signal;

instantaneous envelope detecting means for obtaining a square component of an amplitude of said level corrected signal;

symbol timing generating means for detecting a symbol timing from an output signal of said instantaneous envelope detecting means:

first desired signal level detecting means for obtaining a signal level of a desired signal by accumulating the output signal of said instantaneous envelope detection means over a range of a propagation delay time using a symbol timing signal outputted from said symbol timing generating means as a reference; and second desired signal level detecting means for obtaining a signal level of the desired signal by accumulating, over a few symbol interval, a desired signal level outputted from said first desired signal level detecting means.

2. An automatic gain control apparatus of a spread spectrum signal receiver having variable gain control amplifying means for amplifying a received spread spectrum signal, quadrature detection means for quadrature-detecting a signal amplified by said variable gain control amplifying means, and despreading means for despreading a signal quadrature-detected by said quadrature detection means, said automatic gain control apparatus further comprising:

means for obtaining an in-phase component and a quadrature component of a modulated signal despread by said despreading means;

A/D converting means for converting output signals of said quadrature detection means into digital signals to be supplied to said despreading means;

digital level correcting means for digitally converting a level of an in-phase component and that of a quadrature component of said digital signals to obtain a level corrected signal;

instantaneous envelope detecting means for obtaining a square component of an amplitude of said level corrected signal;

symbol timing generating means for detecting a symbol timing from an output signal of said instantaneous envelope detecting means:

first desired signal level detecting means for obtaining a signal level of a desired signal by accumulating the output signal of said instantaneous envelope detection means over a range of a propagation delay time using a symbol timing signal outputted from said symbol timing generating means as a reference; and second desired signal level detecting means for obtaining a signal level of the desired signal by accumulating, over a few symbol interval, a desired signal level outputted from said first desired signal level detecting means, wherein said digital level correcting means corrects the output signal level of said first desired signal level detecting means to take a constant value by using the output of said first desired signal level detecting means, and said variable gain control amplifying means perform amplification to make the output signal level of said second desired signal level detecting means constant by using the output of said second desired signal level detecting means.

3. The automatic gain control apparatus as claimed in claim 2, further comprising:

an envelope detector for detecting an envelope level of an output signal of said variable gain control amplifying means; and means for correcting an operating point of said variable gain amplifying means such that an output signal of said envelope detector is reduced by using the output signal of said envelope detector when the output signal of said envelope detector exceeds a predetermined level.

4. A CDMA mobile spread spectrum communication apparatus having receiving means for receiving a spread spectrum signal, analog variable gain control amplifying means for amplifying the spread spectrum signal received by said receiving means, quadrature detection means for quadrature-detecting a signal amplified by said variable gain control amplifying means, and despreading means for despreading a signal quadrature-detected by said quadrature detection means, said communication apparatus further comprising:

means for obtaining an in-phase component and a quadrature component of a modulated signal despread by said despreading means;

A/D converting means for converting output signals of said quadrature detection means into digital signals to be supplied to said despreading means:

digital level correcting means for digitally converting a level of an in-phase component and that of a quadrature component of said digital signals to obtain a level corrected signal;

instantaneous envelope detecting means for obtaining a square component of an amplitude of said level corrected signal;

symbol timing generating means for detecting a symbol timing from an output signal of said instantaneous envelope detecting means;

first desired signal level detecting means for obtaining a signal level of a desired signal by accumulating the output signal of said instantaneous envelope detection means over a range of a propagation delay time using a symbol timing signal outputted from said symbol timing generating means as a reference; and second desired signal level detecting means for obtaining a signal level of the desired signal by accumulating, over a few symbol interval, a desired signal level outputted from said first desired signal level detecting means.

5. A spread spectrum communication apparatus having receiving means for receiving a spread spectrum signal, variable gain control amplifying means for amplifying the spread spectrum signal received by said receiving means, quadrature detection means for quadrature-detecting a signal amplified by said variable gain control amplifying means, and despreading means for despreading a signal quadrature-detected by said quadrature detection means, said communication apparatus further comprising:

means for obtaining an in-phase component and a quadrature component of a modulated signal despread by said despreading means;

A/D converting means for converting output signals of said quadrature detection means into digital signals to be supplied to said despreading means:

digital level correcting means for digitally converting a level of an in-phase component and that of a quadrature component of said digital signals to obtain a level corrected signal;

instantaneous envelope detecting means for obtaining a square component of an amplitude of said level corrected signal;

symbol timing generating means for detecting a symbol timing from an output signal of said instantaneous envelope detecting means;

first desired signal level detecting means for obtaining a signal level of a desired signal by accumulating the output signal of said instantaneous envelope detection means over a range of a propagation delay time using a symbol timing signal outputted from said symbol timing generating means as a reference; and second desired signal level detecting means for obtaining a signal level of the desired signal by accumulating, over a few symbol interval, a desired signal level outputted from said first desired signal level detecting means, wherein said digital level correcting means corrects the output signal level of said first desired signal level detecting means to take a constant value by using the output of said first desired signal level detecting means, and said variable gain control amplifying means performs amplification to make constant the output signal level of said second desired signal level detecting means by using the output of said second desired signal level detecting means.

6. The communication apparatus as claimed in claim 5, further comprising:

an envelope detector for detecting an envelope level of an output signal of said variable gain control amplifying means; and means for correcting an operating point of said variable gain amplifying means such that an output signal of said envelope detector is reduced by using the output signal of said envelope detector when the output signal of said envelope detector exceeds a predetermined level.

7. An automatic gain control method applied to an automatic gain control apparatus of a spread spectrum signal receiver, in CDMA mobile communication system, having analog variable gain control amplifying means for amplifying a received spread spectrum signal, quadrature detection means for quadrature-detecting a signal amplified by said variable gain control amplifying means, and despreading means for despreading a signal quadrature-detected by said quadrature detection means, said method further comprising:

step of obtaining an in-phase component and a quadrature component of a modulated signal despread by said despreading means;

A/D converting step of converting output signals of said quadrature detection means into digital signals to be supplied to said despreading means:

digital level correcting step of digitally converting a level of an in-phase component and that of a quadrature component of said digital signals to obtain a level corrected signal;

instantaneous envelope detecting step of obtaining a square component of an amplitude of said level corrected signal;

symbol timing generating step of detecting a symbol timing from an output signal of said instantaneous envelope detecting means;

first desired signal level detecting step of obtaining a signal level of a desired signal by accumulating the output signal of said instantaneous envelope detection step over a range of a propagation delay time using the symbol timing as a reference; and second desired signal level detecting step of obtaining a signal level of the desired signal by accumulating, over a few symbol interval, a desired signal level outputted from said first desired signal level detecting step.

8. An automatic gain control method applied to an automatic gain control apparatus of a spread spectrum signal receiver having variable gain control amplifying means for amplifying a received spread spectrum signal, quadrature detection means for quadrature-detecting a signal amplified by said variable gain control amplifying means, and despreading means for despreading a signal quadrature-detected by said quadrature detection means, said method further comprising:

step of obtaining an in-phase component and a quadrature component of a modulated signal despread by said despreading means;

A/D converting step of converting output signals of said quadrature detection means into digital signals to be supplied to said despreading means:

digital level correcting step of digitally converting a level of an in-phase component and that of a quadrature component of said digital signals to obtain a level corrected signal;

instantaneous envelope detecting step of obtaining a square component of an amplitude of said level corrected signal;

symbol timing generating step of detecting a symbol timing from an output signal of said instantaneous envelope detecting means;

first desired signal level detecting step of obtaining a signal level of a desired signal by accumulating the output signal of said instantaneous envelope detection step over a range of a propagation delay time using the symbol timing as a reference; and second desired signal level detecting step of obtaining a signal level of the desired signal by accumulating, over a few symbol interval, a desired signal level outputted from said first desired signal level detecting step, wherein said digital level correcting step corrects the output signal level of said first desired signal level detecting step to take a constant value by using the output of said first desired signal level detecting step, and said variable gain control amplifying step performs amplification to make the output signal level of said second desired signal level detecting step by using the output of said second desired signal level detecting step.

9. The automatic gain control method as claimed in claim 8, further comprising:

an envelope detecting step of detecting an envelope level of an output signal of said variable gain control amplifying step; and a step of correcting an operating point of said variable gain amplifying means such that an output signal of said envelope detecting step is reduced by using the output signal of said envelope detecting step when the output signal of said envelope detecting exceeds a predetermined level.

10. A spread spectrum signal receiver for a CDMA mobile communication system, comprising:

an analog variable gain control amplifier for amplifying a received spread spectrum signal, a quadrature detector for quadrature-detecting a signal amplified by said variable gain control amplifier, a despreading processor for despreading a signal quadrature-detected by said quadrature detector, means for obtaining an in-phase component and a quadrature component of a modulated signal despread by said despreading processor;

an A/D converter for converting output signals of said quadrature detector into digital signals to be supplied to said despreading processor;

a digital level corrector for digitally converting a level of an in-phase component and that of a quadrature component of said digital signals;

a first signal level detector for obtaining a first signal level indicative of envelop variations in the received signals prior to despreading to control a gain of said analog variable gain amplifier in response to the first signal level; and a second signal level detector for obtaining a second signal level indicative of the level of the received signal after despreading to control a level of said digital level corrector in response to the second signal level.

* * * * *